Figures 1, 4:
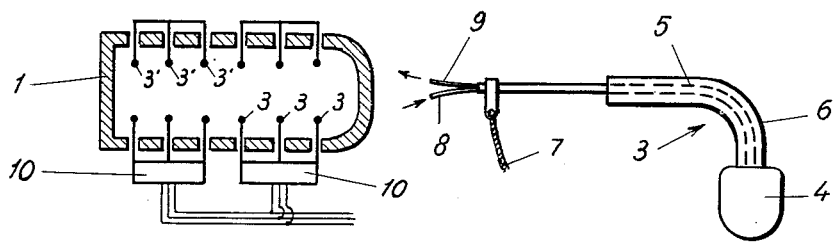

April 8, 1952  E. LUBATTI  2,591,708

ELECTRIC GLASS FURNACE

Filed Aug. 21, 1948  2 SHEETS—SHEET 1

INVENTOR:
EUGENIO LUBATTI

April 8, 1952     E. LUBATTI     2,591,708
ELECTRIC GLASS FURNACE

Filed Aug. 21, 1948     2 SHEETS—SHEET 2

INVENTOR:
EUGENIO LUBATTI
BY

Patented Apr. 8, 1952

2,591,708

UNITED STATES PATENT OFFICE 2,591,708

ELECTRIC GLASS FURNACE

Eugenio Lubatti, Turin, Italy

Application August 21, 1948, Serial No. 45,466
In Italy August 25, 1947

1 Claim. (Cl. 13—6)

This invention relates to a device for electrically heating a bath of molten material and it refers more particularly to glass furnaces.

The glass technique, in some cases, employs instead of the fuel heating of smelting furnaces an equipment for heating glass furnaces electrically, thus obtaining the advantage of substantial simplification of the refractory structure of the furnace and of reducing pollution of the batch as well as many other advantages inherent in electrical appliances used, among which being mentioned dispensing with storage of fuel and with equipment for effectuating combustion.

In prior applications, in order to change from a coal or an oil heating to electrical heating it was necessary to give up the normal type of furnace construction. Consequently a quite different plant with complex and costly apparatuses have to be installed which made stoppage of work for many months necessary, and which required the work of skilled workers, not always found amongst workmen of glass factories.

Furthermore in the electrical furnaces known up to now the electrical current, which produces the heating of the bath by Joule effect, was led to the molten bath by means of electrodes the form of which differed from case to case, but which were fixedly arranged with respect to the furnace.

The electrodes necessitated also refractory wall construction of difficult execution, which does not allow easy inspection, repair work or replacement of devices supplying the electric current to the furnace bath.

According to the invention a new device employing quite a different method is proposed, which has many advantages of construction, of economy in cost and of convenience of use, as well as particular advantages which refer to the working of the furnace.

Method and device according to the invention lead to the following advantages:

(a) the electrodes are movable which supply the current to the bath.

(b) the necessary electrical equipment is arranged so as to ensure convenientt handling, ease of transportation and employment of non-skilled workers.

(c) normal basin furnaces, may be further used allowing the working thereof alternatively with electrical and with fuel heating.

(d) the construction of furnaces may be simplified for this type of heating.

Generally the device according to the invention comprises one or more sets of electrodes which lead the current to the molten bath which is heated by means of internal resistance.

In the case of small furnaces a single set generally suffices; in bigger furnaces many sets are provided, each of which is, for instance, of 30 to 100 kw., and which heats an area of the furnace in which it gives rise to the desired temperature, independently of the others.

There is the possibility of a voltage regulation, every set being connected to the network by a multisteps transformer.

The transformer, the switch and other devices further mentioned constitute a set mounted on wheels which carries the electrodes, the form, the disposition and other particulars of which are defined later on.

Having many heating sets of a relatively small size and of limited power available, is advantageous inasmuch as it allows one to put out of operation or even to withdraw from the furnace for replacement a set without stoppage of the whole furnace.

The provision of sets as independent units reduces to a minimum the time required for the installation of such independent sets which are delivered in assembled condition, requiring only a short period of stoppage of the plant if it previously worked with fuel heating.

Every set carries electrodes which are adjustable, as to the height, in order to dip them more or less in the molten bath, as well as to move the same horizontally, in order to regulate the approach of the electrodes, or to increase their distance from each other, and so it carries out a regulation of the current flowing from each electrode. This way of independent regulation of each electrode is furthermore of advantage as it allows a variation of the temperature from point to point so as to let the technological process to develop in the way required by the particular nature of the batch.

The number of electrodes may vary: from a single electrode (in such case a part of the basin acts as a second pole) to two electrodes (monophase current) to three or more electrodes (three-phase or poly-phase current).

In the prefered embodiments which follow reference is made to the three-phase current which is by far the one used most by the glass factories.

The control of the electrodes may be carried out by hand or automatically, and by means of the displacements of some of them with reference to the electrode or electrodes with which it shuts the circuit the intensity of current is kept constant, preventing it from varying as a consequence of the changed conductivity of the bath.

Figure 2:
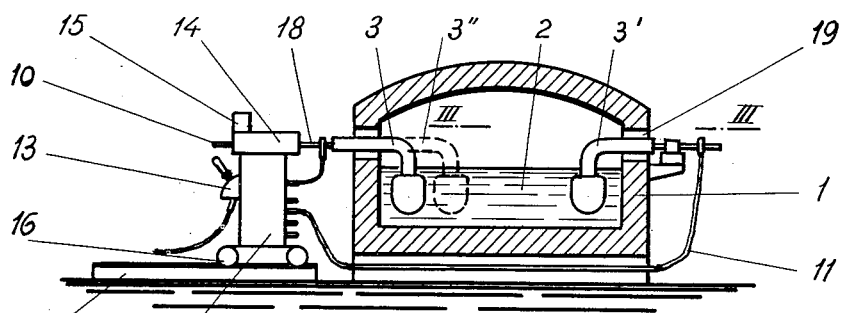
Figure 3:
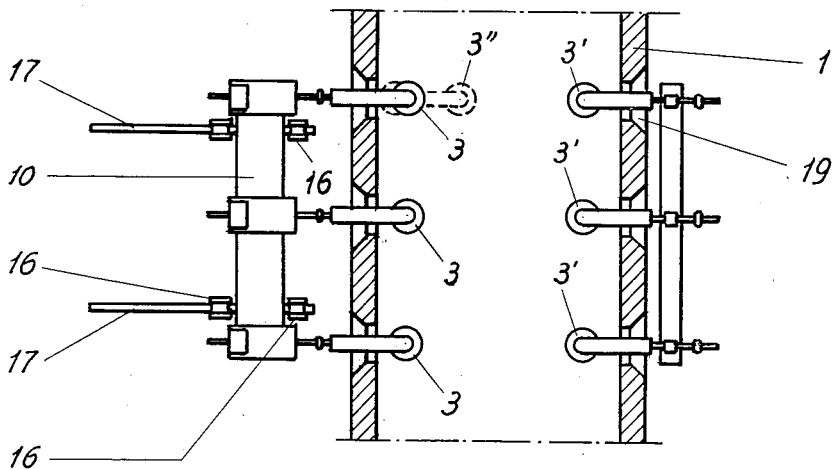
Figure 5:
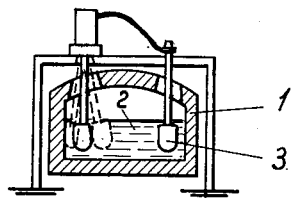
Figure 6:
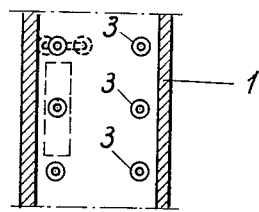

The invention is described by way of example, but not confined, with reference to the annexed drawings of which:

Fig. 1 shows diagrammatically in plan view, and partially in section, a furnace with two sets according to the invention, Fig. 2 shows a side view and transverse section of a furnace with a set according to the invention, Fig. 3 shows a partial plan of the furnace of Fig. 2 and a section through the line III—III of said figure, Fig. 4 shows a side view of an electrode and the means for the electrical connection, for the cooling and for the thermal insulation, Figs. 5 and 6, similar to Figs. 2 and 3, show a modified embodiment, and so do Figs. 7 and 8, 9 and 10, 11 and 12.

In the drawings 1 denotes the furnace, containing a molten glass bath 2, heated by means of electrodes 3, 3'; as may be seen from Fig. 4 each electrode comprises a head 4, which dips into the bath 2, and is carried by an arm or electrically conductive supporting element 5 a portion of which near to the head 4 is thermically insulated as at 6; the arm or supporting element 5 is provided with clamp means for the connection to the cable 7 which supplies the current and through which is passed a cooling fluid (preferably water), which enters at 8 and leaves at 9, as more clearly disclosed in co-pending U. S. patent application Ser. No. 87,018 filed April 12, 1949.

As may be seen from the Figs. 1, 2 and 3 every heating set employs one or more electrodes 3, directly carried by the unit 10, which is described later on, and generally one or more electrodes 3' placed in the furnace at the side opposite to the electrodes 3 and connected to the unit 10 preferably by means of a cable 11 which can, by way of example, be led through a tunnel passing under the furnace.

The unit indicated by 10 comprises the whole electrical equipment and in the preferred embodiment shown in the drawings it consists of electric current distributing means in the form of a transformer 12, preferably a multisteps transformer, a switch 13 and, for every electrode, a regulation device 14, and an ammeter 15, all parts being placed on a truck or carriage with wheels 16 which rolls on rails or track 17.

In the embodiment shown on the Figs. 2 and 3 the electrodes 3' are fixedly mounted, while the electrodes 3 can be moved, as indicated by dotted lines in 3'' in lengthwise direction of arm 5 by virtue of the fact that the rod or horizontal portion 18 of the supporting element carrying said electrodes may slide along its own axis.

In the embodiment according to Figs. 5 and 6 however the movement of the electrodes, which enter the furnace from the ceiling, is obtained by means of a rocking movement about the upper bearing.

Figure 7:
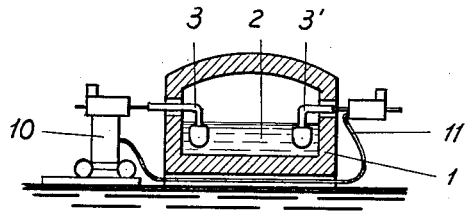
Figure 8:
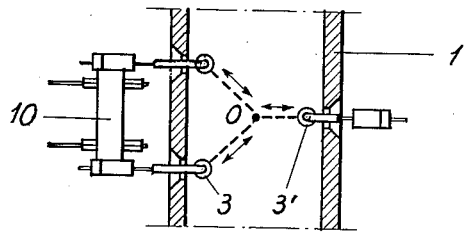

Figs. 7 and 8 indicate the movements of three electrodes which at the same time approach or diverge from a centre O which acts as a star-centre.

Figure 11:
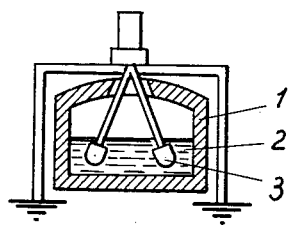
Figure 9:
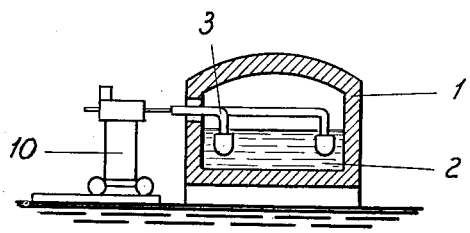
Figure 12:
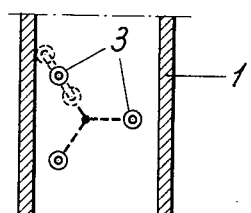
Figure 10:
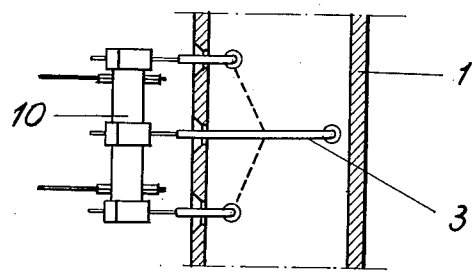

Figs. 9 and 10 show a similar method of moving the three electrodes which are all supported by the unit 10; and lastly according to Figs. 11 and 12 the three electrodes rock about a centre which lies above the ceiling.

It is understood that the openings 19 shown in the walls and/or in the ceiling of the furnace are filled and closed by suitable means.

This invention is illustrated and described with reference to some preferred embodiments, but it is understood that some variations may be made in the practical construction, without exceeding the scope of this disclosure.

What I claim as my invention and desire to secure by Letters Patent is:

A furnace for electrically heating molten glass mass in a bath, comprising, in combination, a furnace chamber provided with at least two lateral openings positioned on opposite sides of said chamber above the level of the bath, a pair of electrically conductive supporting elements each having a substantially horizontal portion extending through a respective one of said openings and a substantially vertical, dependent portion joined to said horizontal portion by a bend, at least one pair of electrodes of carbonaceous material secured to the lower ends of the dependent portions of said supporting elements, respectively, said electrodes being adapted to extend below the level of said bath, a stationary support positioned outside said chamber adjacent one of said openings, a carriage including electrical distributing means, said carriage being movable relative to said chamber and positioned outside said chamber adjacent the other of said openings, said supporting elements having the substantially horizontal portions thereof mounted on said support and on said carriage, respectively, and means for supplying electric current to said supporting elements from said electric current distributing means of said carriage.

EUGENIO LUBATTI.

REFERENCES CITED

The following references are of record in the file of this patent:

UNITED STATES PATENTS

| Number | Name | Date |
|---|---|---|
| 1,352,541 | Von Schlegell | Sept. 14, 1920 |
| 1,378,972 | Moore | May 24, 1921 |
| 1,542,716 | Payne | June 16, 1925 |
| 1,594,496 | Clark | Aug. 3, 1926 |
| 1,687,925 | Briggs | Oct. 16, 1928 |
| 1,880,540 | Wadman | Oct. 4, 1932 |
| 1,889,516 | McIntosh | Nov. 29, 1932 |
| 1,897,973 | Wadman | Feb. 14, 1933 |
| 2,133,329 | Moore et al. | Oct. 18, 1938 |
| 2,156,608 | Schon et al. | May 2, 1939 |
| 2,234,476 | Jessop | Mar. 11, 1941 |
| 2,349,678 | Rolnick | May 23, 1944 |
| 2,406,147 | Hopkins | Aug. 20, 1946 |
| 2,471,531 | McIntyre et al. | May 31, 1949 |

FOREIGN PATENTS

| Number | Country | Date |
|---|---|---|
| 13,241 | Switzerland | Oct. 13, 1896 |
| 56,755 | Norway | June 29, 1936 |